Patented Dec. 11, 1934

1,983,556

UNITED STATES PATENT OFFICE 1,983,556

TREATMENT OF PERISHABLE MATERIALS FOR FIXATION

Hughbert W. M. McCrabbe, Los Angeles, Calif., assignor to International Vitacrine Laboratory Corporation, New York, N. Y.

No Drawing. Application January 25, 1932
Serial No. 588,821

4 Claims. (Cl. 99—11)

This invention relates to preservation of the alimentary qualities of perishable materials among which are meat, fish, and vegetable products and pertains more especially to fixation of the vitamins and retention of the nutritional values.

Dehydration of such products is now commonly practiced to preserve the nutritional qualities. In dehydration, the products are subjected to heat. Not only is the water or liquid extracted from the products by dehydration but their solid structure undergoes change. In some instances, as with lettuce, the body is burned and dehydration cannot be performed without destruction of vitamins and nutritional values. Food has been preserved by cooking in syrups and by immersing the fresh food in sugar and maintaining the immersed product at a low temperature.

I have found that fresh animal and vegetable products may be fixed as to their alimentary qualities including vitamins by applying to the membranes thereof a liquid which causes the juice of the product to pass through the membrane and diffuse in the liquid. In referring to juice, I mean the watery content thereof or at least a very substantial part thereof.

I do not wish to limit myself to any theory, but only to rely on the facts disclosed by my investigations. However, it appears that extraction effected by my process is due to osmosis. The membrane of the product while fresh acts as a permeable membrane through which the juice may pass under osmotic pressure.

As illustrative of the process, green alfalfa, lettuce or other greens are coated with a thin layer of blackstrap molasses. It is found that this coating may be efficiently accomplished by shredding the greens and adding a slight amount of molasses, then mixing the greens and molasses so as to distribute the same over the surface of the greens. The liquid content on the outside of the greens begins to increase and the molasses to thin, a watery liquid finally running off the greens. The product is next pressed to separate the extraction liquid solution and dehydrated greens remain with their original color. These may be dried and either left in their whole condition or ground. I have found that any sugary liquid, such as a cane sugar solution will serve the purpose. In the case of foods for human consumption cane or beet sugar solutions are found not to cause any objectionable flavor in the product. In the case of animal foods cheaper syrups may be used. Alfalfa may be treated by simultaneously harvesting the alfalfa and as it is cut, spraying it with a syrupy liquid. It is then deposited in windrows and the surface ventilation causes evaporation of the extracted fluid. The color of the alfalfa is retained and the nutritional qualities fixed.

The dehydrated product does not disintegrate. Microscopic examination of the cellular structure shows that all of the cells have been robbed of their juices. In referring to juices, I do not limit my meaning to all of the sap, but substantially all of the watery content. I find that something other than water is extracted, as the extraction liquid is changed other than by mere addition of water, and such extraction liquid solutions may have useful properties which I have not yet determined. I have found that liver and other animal products may be treated in this manner. Referring specifically to liver, it may be sprayed with a syrup immediately after the liver is removed from the animal in the abattoir. It also may be treated by causing the syrup to course through the blood vessels and other tubular vessels of the body. I have also found that products having oils may have the oils extracted by causing an oily liquid of higher viscosity than the oil contained in the product to be applied to the products. Pancreatic materials may be so treated with cod liver oil, fish oil and paraffin oil.

There is a pressure gradient from the juice of the product to the extraction liquid resulting in a flow of juice through the membrane. The fluid from the product is diffused through the membrane to and into the extraction liquid. As this action corresponds to or is osmosis, I have chosen to define the invention in terms of osmosis.

What I claim is:—

1. The infusion process of fixing the contents of cells of a fresh product having membranes thereover which comprises placing a syrup in contact with the membranes to extract the juice from said product and thereby producing an extraneous resultant liquid and continuously removing said resultant liquid before permeation of said cells by said liquid.

2. The infusion process of treating a fresh natural product which comprises contacting the exterior surface with a syrup and thereby causing a flow of juice from the product to the syrup and thereby producing an extraneous resultant liquid, and continuously separating the said resultant liquid from the product so treated before permeation of said cells by said liquid.

3. The infusion process of separating juices from solids in the cells of fresh natural products having membranes thereover, which comprises placing on the membranes a syrup so related to the juice of said product as to produce an osmotic pressure causing osmotic diffusion of liquid from said product to said syrup thereby producing an extraneous resultant liquid, and continuously separating the resultant liquid and the dehydrated product before permeation of said cells by said resultant liquid.

4. The infusion process of separating juices from solids of fresh natural products having a superficial membrane thereover, which comprises placing on the membrane in contact therewith a syrup so related to the juice of said product to produce endosmotic flow of juice to said syrup to produce an extraneous resultant liquid, and continuously separating said resultant liquid and the dehydrated product before permeation of said cells by said resultant liquid.

HUGHBERT W. M. McCRABBE.